(12) United States Patent
Xu et al.

(10) Patent No.: US 10,601,303 B2
(45) Date of Patent: Mar. 24, 2020

(54) CONTROL METHOD AND DEVICE FOR CIRCUIT WITH A BRIDGE ARM OF A SWITCH

(71) Applicant: Vertiv Tech Co., Ltd., Shenzhen (CN)

(72) Inventors: Fubin Xu, Guangdong (CN); Hai Huang, Guangdong (CN); Yang Bing, Guangdong (CN)

(73) Assignee: Vertiv Tech Co., Ltd., Shenzhen (CN)

( * ) Notice: Subject to any disclaimer, the term of this patent is extended or adjusted under 35 U.S.C. 154(b) by 0 days.

(21) Appl. No.: 15/666,193

(22) Filed: Aug. 1, 2017

(65) Prior Publication Data
US 2018/0041109 A1 Feb. 8, 2018

(30) Foreign Application Priority Data
Aug. 8, 2016 (CN) .......................... 2016 1 0643264

(51) Int. Cl.
*H02M 7/5387* (2007.01)
*H02M 1/08* (2006.01)
(Continued)

(52) U.S. Cl.
CPC .......... *H02M 1/083* (2013.01); *H02M 1/088* (2013.01); *H02M 7/53871* (2013.01); *H02M 2001/0058* (2013.01); *H02M 2007/4815* (2013.01)

(58) Field of Classification Search
CPC .......... H02M 7/42; H02M 7/48; H02M 7/487; H02M 7/493; H02M 7/501; H02M 7/4826;
(Continued)

(56) References Cited

U.S. PATENT DOCUMENTS 6,480,403 B1 * 11/2002 Bijlenga ............... H02M 7/487
363/132
8,638,007 B2 1/2014 Rizet et al.
(Continued)

FOREIGN PATENT DOCUMENTS

CN 101783608 A 7/2010
CN 102055365 A 5/2011
(Continued)

OTHER PUBLICATIONS

Search Report regarding European Patent Application No. 17184883.1, dated Jan. 15, 2018.
(Continued)

*Primary Examiner* — Bryan R Perez
(74) *Attorney, Agent, or Firm* — Harness, Dickey & Pierce, P.L.C.

(57) ABSTRACT

The present invention discloses a control method and device for a circuit with a bridge arm of a switch. The soft switching converter includes at least two bridge arms of the switch, and an auxiliary switch assisting in switching of a main switch of the bridge arm of the switch. The control method includes the steps of:
S1. after controlling the auxiliary switch to be turned on for a first period of time, controlling main switches set at the same position of individual bridge arms of the switch to be simultaneously turned on; S2. after a second period of time following a time when the main switches set at the same position of individual bridge arms of the switch are simultaneously turned on, turning off the auxiliary switch. The present invention can reduce system loss and noise, so as to improve efficiency.

9 Claims, 7 Drawing Sheets

(51) Int. Cl.
*H02M 1/088* (2006.01)
*H02M 1/00* (2006.01)
*H02M 7/48* (2007.01)

(58) Field of Classification Search
CPC ...... H02M 7/49; H02M 7/4807; H02M 7/537; H02M 7/5387; H02M 7/533; H02M 7/53; H02M 5/40; H02M 5/42; H02M 5/44; H02M 5/443; H02M 5/45; H02M 5/4505; H02M 5/451; H02M 5/452; H02M 5/458; H02M 5/4585
See application file for complete search history.

(56) References Cited

U.S. PATENT DOCUMENTS

| | | | |
|---|---|---|---|
| 2002/0172058 A1 | 11/2002 | Szczesny et al. | |
| 2011/0109162 A1 | 5/2011 | Rizet et al. | |
| 2012/0218785 A1* | 8/2012 | Li | H02M 1/34 363/21.12 |
| 2013/0234641 A1* | 9/2013 | Li | H02P 27/08 318/503 |
| 2013/0272045 A1* | 10/2013 | Soeiro | H02M 7/537 363/131 |

FOREIGN PATENT DOCUMENTS

| | | |
|---|---|---|
| CN | 102983767 A | 3/2013 |
| CN | 103001523 A | 3/2013 |

OTHER PUBLICATIONS

Hafiz Abu Bakar Siddique et al. "Adapative Switching-Loss-Optimized Space-Vector Modulation for Three-Level Neutral-Point-Clamped Converters." 17th European Conference on Power Electronics and Applications. Sep. 8, 2015. pp. 1-10.

H. Stemmler et al. "Configurations of High-Power Voltage Source Inverter Drives." Power Electronics and Applications. vol. 5: Drives I. Sep. 13-16, 1993.

Chitra U C et al. "Bus clamping PWM for three level neutral point clamped inverters." 2015 IEEE International Conference on Technological Advancements in Power & Energy. Jun. 24, 2015. pp. 322-326.

Habib Dallagi et al. "Study, Analysis and Simulation of Three Phase Three-Level, Five-Level and Seven-Level Neutral-Point-Clamped Inverters by PSIM." 15th International Conference on Sciences and Techniques of Automatic Control and Computer Engineering. Hammamet, Tunisia. Dec. 21-23, 2014.

First Chinese Office Action regarding Application No. 201610643264.8 dated Feb. 22, 2019. Translation provided by http://globaldossier.uspto.gov.

* cited by examiner

CONTROL METHOD AND DEVICE FOR CIRCUIT WITH A BRIDGE ARM OF A SWITCH

CROSS REFERENCE TO RELATED APPLICATION

This application claims the priority of Chinese Patent Application No. 201610643264.8, entitled "A CONTROL METHOD AND DEVICE FOR CIRCUIT WITH A BRIDGE ARM OF A SWITCH" filed with the Chinese Patent Office on Aug. 8, 2016, which is incorporated herein by reference in its entirety.

TECHNICAL FIELD

The present application relates to a filed of a circuit, and particularly to a control method and device for a circuit with a bridge arm in which main switches are provided.

BACKGROUND ART

The development of a power electronic device is orientated to miniaturization, lightweight, high efficiency, and low cost. In the conventional power supply systems, a power semiconductor device is in a hard switching operation state, and there is a larger overlapping area between voltage and current, causing problems such as large switch loss, electromagnetic interference noise, ringing and the like, thus resulting in high cost, huge volume and low efficiency of the systems. If high performance is desired to be available, high cost is needed. With fiercer competition in power electronics market, the semiconductor industry has developed rapidly, but high-performance devices have not yet been used in large scale, so the study on soft switching circuit topology is still a selection for most of power supply manufactures to improve product competitiveness.

Figure 1:
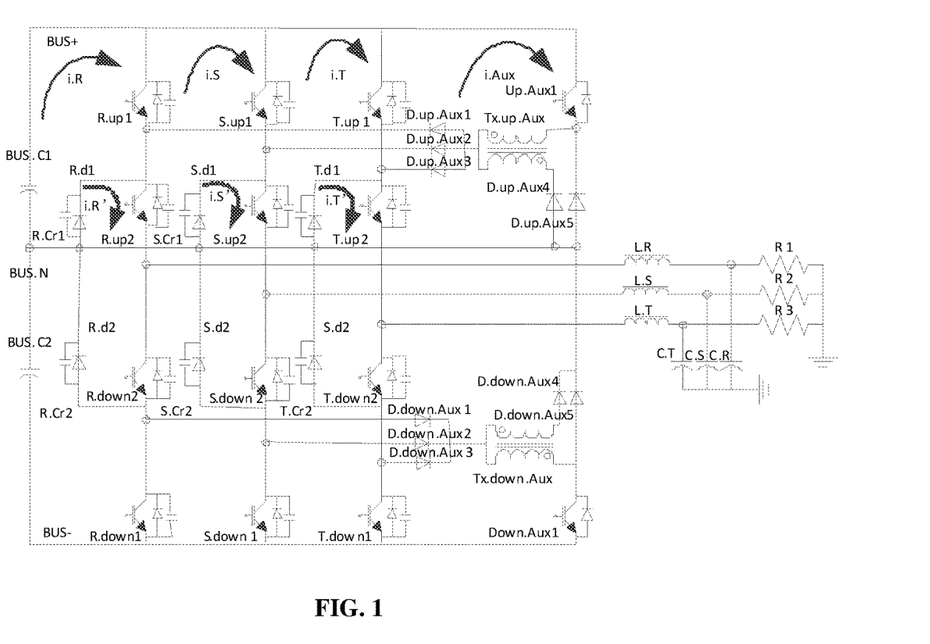
FIG. 1 is a topology structure diagram of the three-phase soft switching NPC1-type inverter in the prior art.

FIG. 1 shows a conventional circuit topology of the three-phase soft switching NPC1-type inverter in the prior art, which is composed of three NPC1 bridge arms, including an S-phase bridge arm, a R-phase bridge arm and a T-phase bridge arm, wherein the R-phase bridge arm comprises a main switch R.up1, a main switch R.up2, a main switch R.down2, and a main switch R.down1; the S-phase bridge arm comprises a main switch S.up1, a main switch S.up2, a main switch S.down2, and a main switch S.down1; and the T-phase bridge arm comprises a main switch T.up1, a main switch T.up2, a main switch T.down2, and a main switch T.down1. Each bridge arm is composed of upper and lower bridge arms (for example, an upper bridge arm of the R-phase bridge arm comprises the main switch R.up1 and the main switch R.up2, and a lower bridge arm of the R-phase bridge arm comprises the main switch R.down1 and the main switch R.down2) for controlling positive and negative half cycles respectively, the four switches may be semiconductor devices such as an IGBT, an MOSFET, a GTO or an SCR or the like, and diodes R.d1, R.d2 are used for performing the functions such as clamping, Buck output freewheeling, Boost output energy storage and the like for output point voltage. Diodes connected in parallel with main switches (power switches) are body diodes or external diodes. Capacitances in parallel with the main switches are junction capacitances or are externally connected in parallel. The magnitude of output filtering capacitances C.R, C.S and C.T and inductors L.R, L.S and L.T is determined by factors such as system power and switching frequency and the like. An auxiliary switch circuit comprises auxiliary switches Up.Aux1, Down.Aux1, coupling inductors Tx.up.Aux, Tx.Down.Aux and the like, and are provided to realize zero voltage switching on (ZVS) of main power switch devices and soft recovery of diodes. Junction capacitances connected in parallel with main power devices (i.e., main switches) can soften a turn-off process, and act as key elements of resonance in a turn-on process. A plurality of bridge arms can realize zero voltage switching on (ZVS) of three-phase main power switch devices via diode logic wired AND. An auxiliary switch drive circuit varies depending on control method and logic, and various auxiliary switch drive circuit differ for the system to realize soft switching principle and efficiency improvement. A difference between BUS+ and BUS− is bus voltage. BUS.C1 and BUS.C2 are positive and negative voltage-stabilized bus capacitances, respectively, and may be regarded as constant voltage sources during analysis.

By the auxiliary switch circuit, activated current enters the auxiliary switch circuit, such that a switching process of freewheeling current of the main switch circuit towards energy storage current is softened, so as to reduce an overlapping area between voltage and current to the largest extent.

Figure 2:
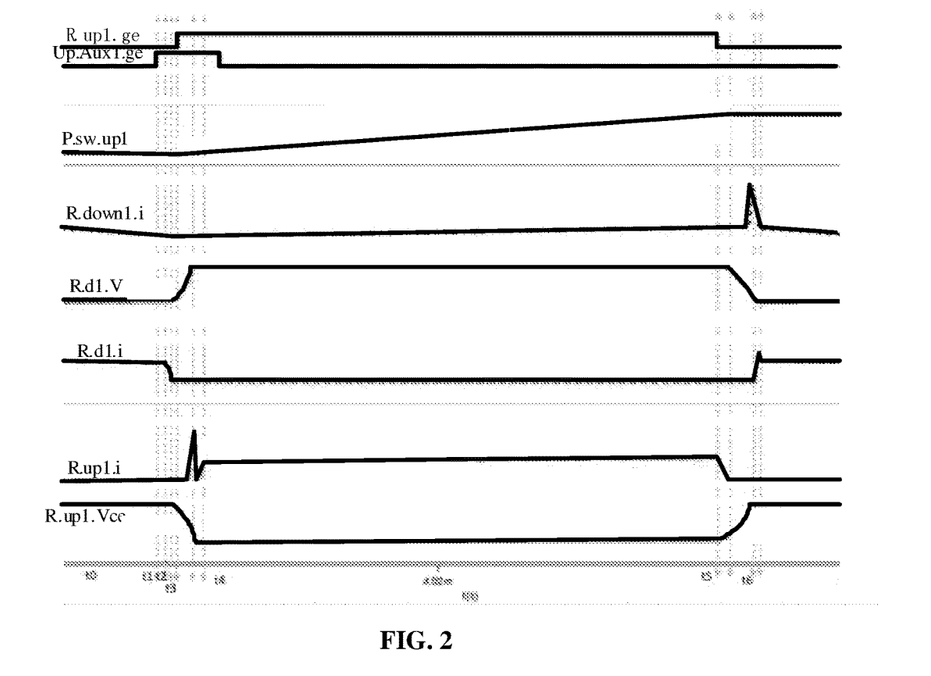
FIG. 2 is a waveform diagram of some devices for an R-phase in a soft switching control method of the three-phase soft switching NPC1-type inverter in FIG. 1.
Figure 3:
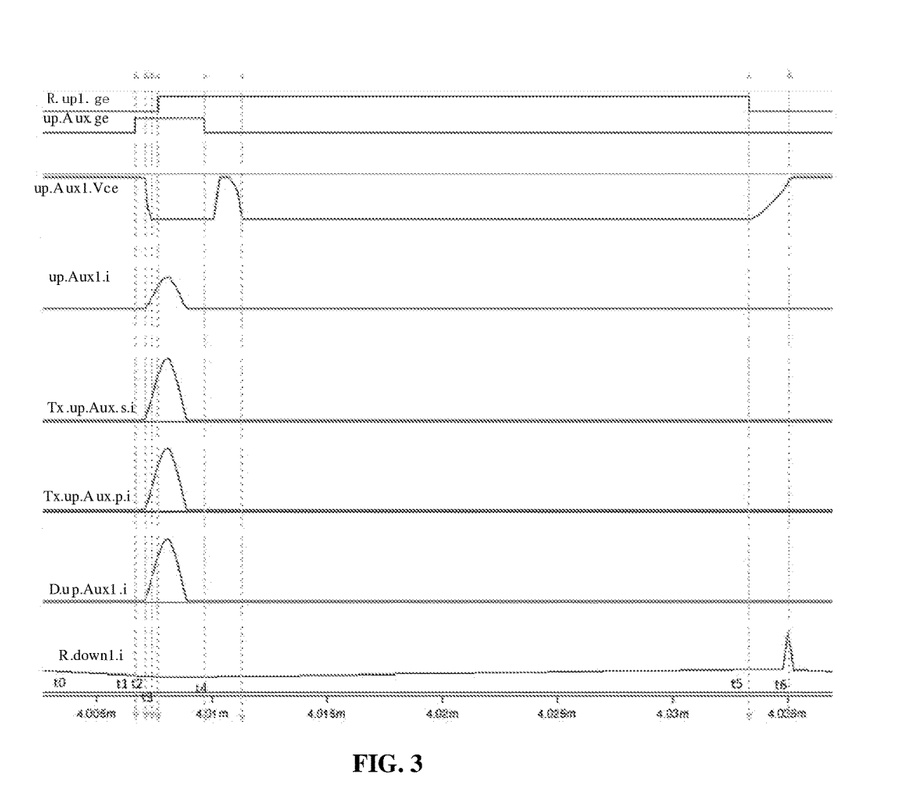
FIG. 3 is a waveform diagram of some devices of an auxiliary switch circuit in the three-phase soft switching NPC1-type inverter in FIG. 1.

FIG. 2 is an operation waveform diagram of a single-phase main switch circuit of the three-phase soft switching NPC1-type inverter in the prior art, and FIG. 3 is an operation waveform diagram of a single-phase auxiliary switch circuit of the three-phase soft switching NPC1-type inverter in the prior art.

Referring to FIG. 1 to FIG. 3, supposing that the R-phase output voltage is in a positive half cycle and that PF=1, the positive bridge arm operates in a Buck operation mode, the main switch R.up1 is a high-frequency switch, and the main switch R.down1 is a low-frequency switch and is conductive all the time. Supposing that in an initial state the freewheeling diode R.d1 is conductive to release magnetism, and the auxiliary switch Up.Aux1 and the main switch R.up1 are turned off, current flows out of the freewheeling diode, the main switch R.down1 and the inductor L.R.

Model1 (t1~t2): the auxiliary switch Up.Aux1 is turned on; since the coupling inductor Tx.up.Aux limits a rising rate di/dt of current in the auxiliary switch circuit, the turn-on process of the auxiliary switch Up.Aux1 can be softened, and meanwhile the coupling inductor Tx.up.Aux also reduces a declining rate di/dt of current of the freewheeling diode R.d1, suppressing a reverse recovery current of the freewheeling diode R.d1 effectively, thus realizing soft recovery of the freewheeling diode R.d1. Due to the current sharing function of the coupling inductor Tx.up.Aux, a current stress of the auxiliary switch Up.Aux1 will be assigned to each auxiliary switch equally, so as to reduce an auxiliary current stress.

Model2 (t2~t3): after the auxiliary switch Up.Aux1 is turned on for a period of time, current is completely transferred to the auxiliary switch Up.Aux1, accompanied by LC resonance, so as to realize charging of the capacitor connected in parallel with the main switch R.up1 with the upper portion being positive and the lower portion being negative, wherein when capacitor voltage is greater than conductive voltage of the body diode of the main switch R.up1, forward conduction of the body diode of the main switch R.up1 is realized, such that the LC resonance terminates, and at this time the main switch R.up1 is controlled to be turned on, and meanwhile zero voltage switching on of the main switch R.up1 can be realized, thereby starting a Buck magnetizing mode of the main switch.

Model3 (t3~t4): after the zero voltage switching on of the main switch R.up1, current is transferred from the auxiliary switch circuit to the main switch circuit; upon complete transfer of the current, the auxiliary switch Up.Aux1 is turned off; since the main switch R.up1 performs a function of turning on and in turn clamping, approximate zero-voltage zero-current turn-off of the auxiliary switch can be realized, and in view of the unidirectional current flow characteristic of diode D.up.Aux1, natural inversion of the auxiliary diode can be realized after the LC resonance reaches zero.

Model4 (t4~t5): when it is required to turn off the main switch R.up1, due to the characteristic that capacitance voltage cannot change abruptly and the characteristic that the LC resonance has small damping, LC resonates with high frequencies, also realizing reverse charging of the junction capacitance of the main switch R.up1, thus making it possible to soften the turn-off process of the main switch R.up1. At this time, the auxiliary switch circuit and the main freewheeling diode simultaneously undertake the functions of freewheeling and magnetism releasing.

Model5 (t5~t6): after the main switch R.up1 is turned off, also due to the unidirectional current flow characteristic of diode D.up.Aux1, the LC resonance ends, and the main freewheeling diode undertakes all the freewheeling and magnetizing processes.

Model6 (t0~t6): one switching cycle ends, and a next switching cycle starts. The process is as described above.

The operating principle of the respective devices in a negative half cycle of the output voltage is the same as the operating principle of the respective devices in the positive half cycle thereof. The operating principles of the remaining two phases are the same as the operating principle of the R-phase, and will not be described repeatedly.

In FIG. 2 and FIG. 3, R.up1.ge, Up.Aux1.ge, P.sw.up1, R.down1.i, R.d1.V, R.d1.i, R.up1.i, R.up1.Vce, Up.Aux1.Vce, Up.Aux1.i, Tx.up.Aux.s.i, Tx.up.Aux.p.i, and D.up.Aux1.i respectively represent: control level of the main switch R.up1, control level of the auxiliary switch Up.Aux1, loss of the main switch R.up1, current of the main switch R.down1, voltage of the freewheeling diode R.d1, current of the freewheeling diode R.d1, current of the main switch R.up1, ce voltage drop of the main switch R.up1, ce voltage drop of the auxiliary switch Up.Aux1, current of the auxiliary switch Up.Aux1, current in primary side S of the coupling inductor Tx.up.Aux, current in secondary side p of the coupling inductor Tx.up.Aux, and current of the diode D.up.Aux1. Compared with a three-phase hard switching NPC1-type inverter, turn-on and turn-off loss of the main switch R.up1 of the three-phase soft switching NPC1-type inverter is reduced. As can be seen from FIG. 3, the primary side current Tx.up.Aux.s.i and the secondary side current Tx.up.Aux.p.i of the coupling inductor are equal, and are ½ of D.up.Aux1.i.

The following conclusion can be reached from the above analysis: the soft switching topology of the zero voltage soft switching converter can realize zero voltage switching of the main power switches and soft recovery of the diodes, realize soft turn-off of the main power devices through capacitances in parallel connection, thereby improving system efficiency, and can realize soft switching on of the main switches and zero-current zero-voltage turn-off of the auxiliary switches, and natural inversion of the auxiliary diodes.

In an AC/DC or DC/AC power source, within one switching cycle, it is typical to combine basic voltage vectors such that an average value thereof is equal to a given voltage vector; at a certain time the voltage vectors are rotated and combined such that an average value thereof is equal to a given voltage vector; at a certain time the voltage vectors are rotated into a certain area, which can be obtained by different combinations in terms of time of two neighboring non-zero vector and zero vector constituting this area, action times of the two vectors are applied multiple times within one use cycle, thereby controlling action times of the respective voltage vectors, such that voltage space vectors are rotated approximately in a circular trajectory to generate corresponding PWM waveforms. The PWM waveforms drive actions of the switches, such that given waveforms desired can be obtained through LC filtering.

In the conventional PWM control methods, carriers have a plurality of control freedom degrees such as frequency, phase, amplitude, offset amount and the like. Modulation waves also at least have a plurality of control freedom degrees such as frequency, amplitude, zero-sequence component, shape and the like, and different combinations of these control freedom degrees can generate a large number of PWM control methods.

Although the above existing three-phase soft switching NPC1-type inverter has many advantages, overall machine loss is still relatively large, making it difficult to further improve system efficiency.

SUMMARY OF THE INVENTION

As can be seen from the principle diagram and the waveform analysis, the main switches for individual phases are not simultaneously turned on, so if this circuit desires to realize soft switching of the power switches (the main switches) for each phase, it is necessary that the auxiliary switch acts one time when the main switch for each phase acts, increasing the frequency of switching of the auxiliary switch, thus greatly increasing loss of the auxiliary switch circuit, such as passive resonance loss and switching loss of the auxiliary switch, which is one of the reasons why soft switching efficiency cannot be improved. Each time the auxiliary switch acts, oscillation and ringing will accompany such that problems such as EMI noise and the like will possibly be caused; in addition, driving of the auxiliary switch circuit needs a function of logic OR, that is, when any main switch of an upper bridge arm or main switch of a lower bridge arm is turned on, the driving of the auxiliary switch shall act, and the drive circuit will become complicated, such that both the improvement of system efficiency and the stability will be limited, thus limiting the usage scope and the reliability thereof greatly.

To overcome the above technical problems, the present application provides a control method and device for a circuit with a bridge arm in which main switches provided, so as to reduce system loss and noise, thus improving efficiency.

A control method for a circuit with a bridge arm in which main switches are provided, wherein the circuit comprises at least two bridge arms and an auxiliary switch assisting in switching of the main switches of the bridge arms, characterized in that the control method comprises the following steps:

S1: after controlling the auxiliary switch to be turned on for a first period of time, controlling at least two main switches set at same positions of individual bridge arms to be simultaneously turned on;

S2. after a second period of time following a time when the at least two main switches set at the same position of individual bridge arms are simultaneously turned on, turning off the auxiliary switch.

In one embodiment, in the step S1, at a time when current is completely transferred from a main switch circuit comprising the at least two bridge arms in the circuit to an auxiliary switch circuit comprising the auxiliary switch in the circuit, the main switches set at the same position of individual bridge arms are controlled to be simultaneously turned on; in the step S2, at a time when current is completely transferred from the auxiliary switch circuit to the main switch circuit, the auxiliary switch is turned off.

In one embodiment, the bridge arm is NPC bridge arm.

In one embodiment, in the step S1, main switches at the same position of individual bridge arms which are connected with a bus are controlled to be simultaneously turned on.

In one embodiment, control signals of the main switch of the bridge arm and the auxiliary switch are formed by modulating a carrier signal; prior to the step S1, the control method further comprises a step of:

detecting whether or not an effective edge of the carrier signal appears, and if YES, starting to perform the step S1.

In one embodiment, the carrier signal is right-angled sawtooth waves, the effective edge is a rising edge of the right-angled sawtooth waves.

In one embodiment, the circuit is a soft switching converter.

In one embodiment, the circuit is an AC/DC circuit or a DC/AC circuit.

To overcome the above technical problems, the present application further provides a control device for a circuit with a bridge arm in which main switches are provided, wherein the circuit comprises at least two bridge arms and an auxiliary switch assisting in switching of main switches of the bridge arm, characterized in that the control device comprises the following units:

a first control unit for, after controlling the auxiliary switch to be turned on for a first period of time, controlling main switches set at same positions of individual bridge arms to be simultaneously turned on;

a second control unit for, after a second period of time following a time when the main switches set at the same positions of individual bridge arms are simultaneously turned on, turning off the auxiliary switch.

In one embodiment, the first control unit is used for, at a time when current is completely transferred from a main switch circuit comprising the at least two bridge arms in the circuit to an auxiliary switch circuit comprising the auxiliary switch in the circuit, controlling the main switches set at the same position of individual bridge arms to be simultaneously turned on; the second control unit for, at a time when current is completely transferred from the auxiliary switch circuit to the main switch circuit, turning off the auxiliary switch.

The main switch and the auxiliary switch according to the present application may be power devices such as si devices, for example IGBTs, MOSFETs, DIODEs, and SiC devices, for example MOSFET or DIODE, or the like.

The present application produces the following advantageous effects:

1) By reducing the frequency of the action of the auxiliary switch, it is made possible to reduce passive loss of LC resonance, to reduce loss of the auxiliary switch, to optimize EMI, to reduce ringing and noise, to optimize the auxiliary drive circuit and to reduce system cost, and also it is made possible to optimize voltage and current waveforms during the switching of power devices, to reduce voltage and current stress during the switching, to soften waveforms, to improve system stability and efficiency, and to reduce a heat sink size.

2) By means of particular right-angled sawtooth carriers, it is made possible to reduce the number of times of the switch switching effectively, to offset harmonics of particular order number, to improve harmonics characteristics of input, and to reduce input current THDi.

3) The present application is adapted to control of a circuit containing a plurality of bridge arms of a switch, for example an AC/DC or DC/AC circuit; or an interleaved circuit; or a polymorphic circuit; or a two-level or multi-level inversion or rectification circuit.

4) By using particular right-angled sawtooth wave modulation flexibly, PWM control is simplified, and control structure is simplified, such that a control characteristic of the system is optimized and better.

5) While maintaining the original function of realizing soft switching, by making up the previous topology defects, it is made possible to further improve system efficiency and system stability.

DETAILED DESCRIPTION OF THE EMBODIMENTS

Hereinafter, preferred embodiments of the application will be further described in detail.

Figure 4:
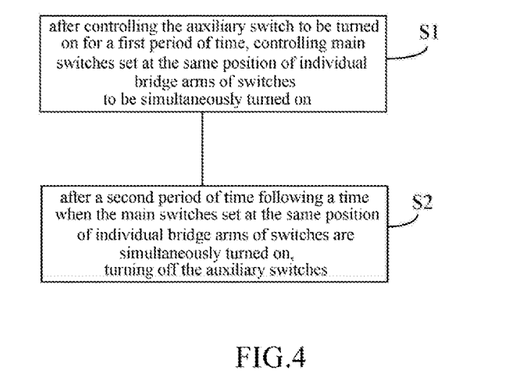
FIG. 4 is a flowchart of a control method for a circuit with a bridge arm according to one embodiment of the present application.
Figure 5A:
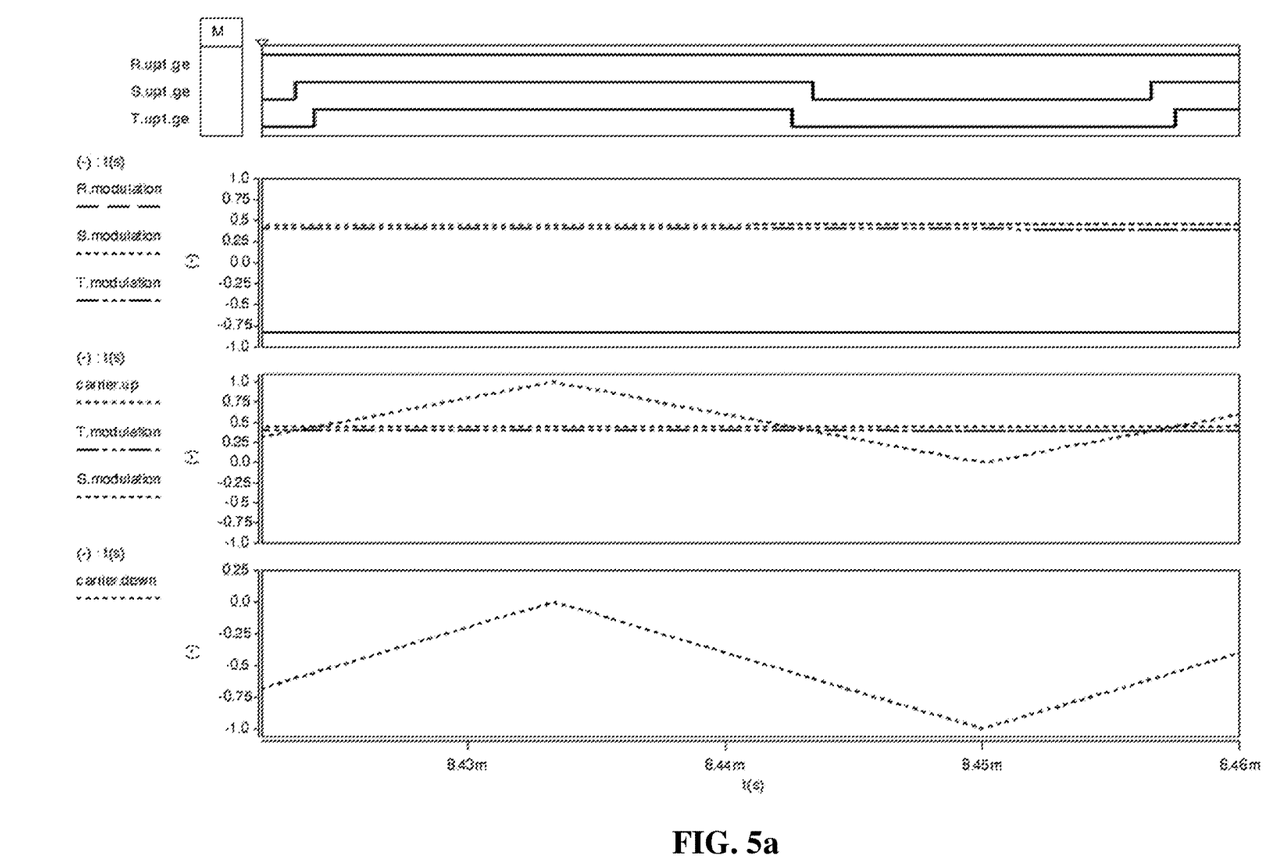
FIG. 5a is a schematic view of modulation waveforms of isosceles triangular carriers of the three-phase soft switching NPC1-type inverter in FIG. 1.
Figure 5B:
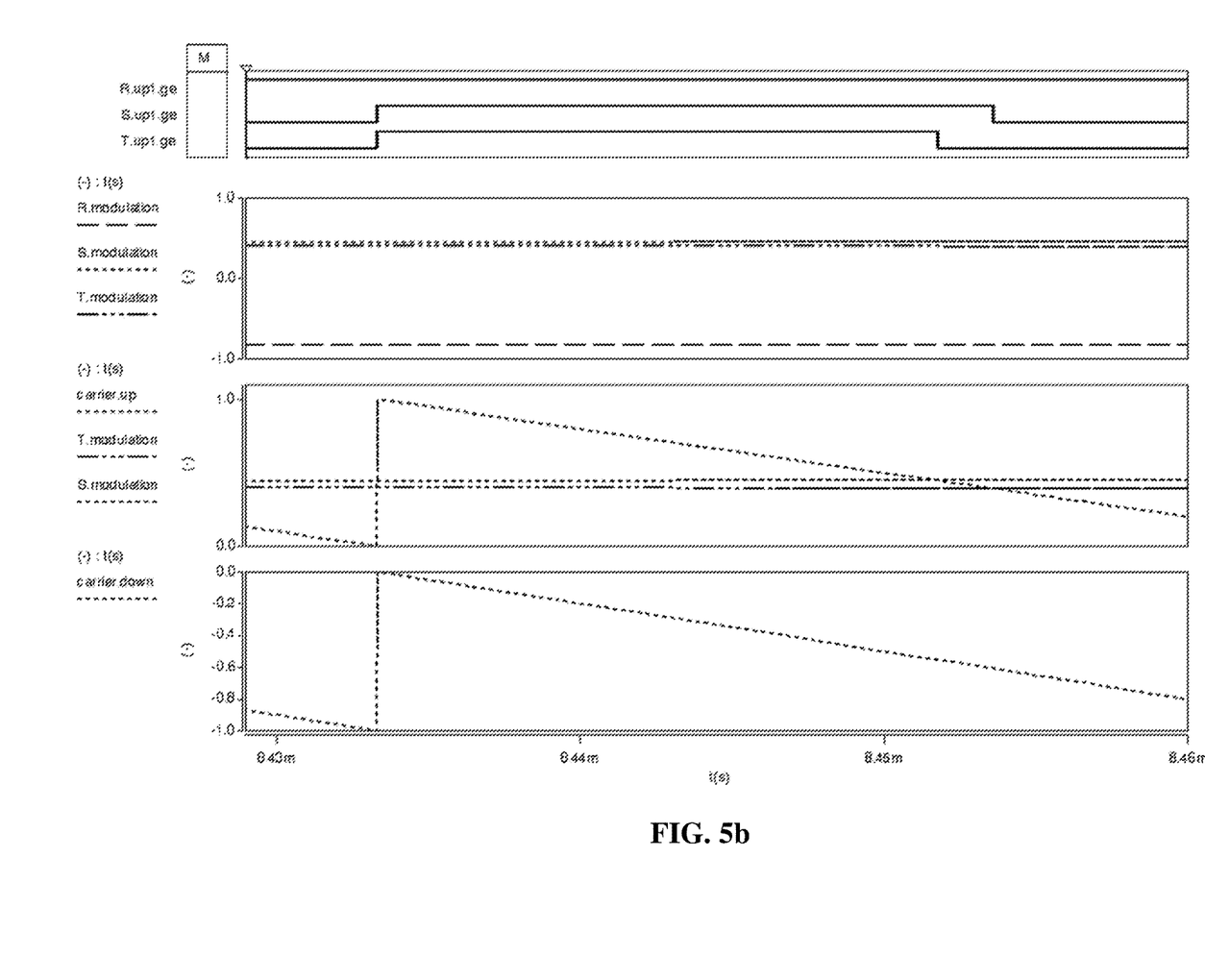
FIG. 5b is a schematic view of modulation waveforms of right-angled sawtooth waves in a control method for a circuit with a bridge arm according to the present application.
Figure 6A:
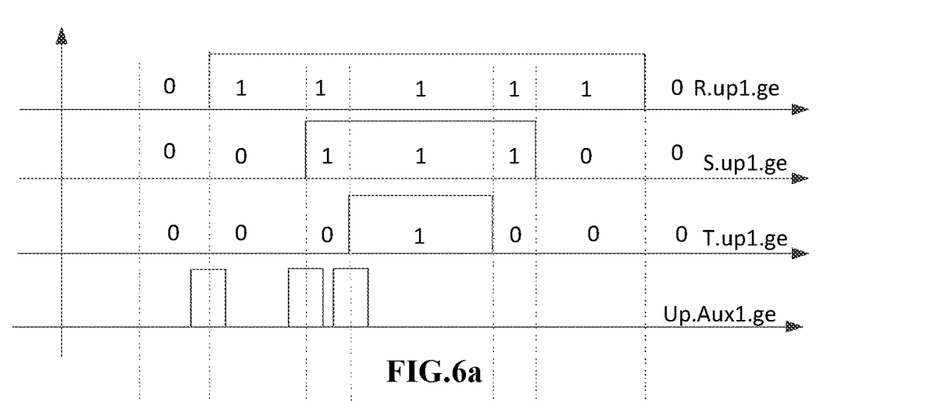
FIG. 6a is a schematic view of a switching combination, modulated with the isosceles triangular carriers, of the three-phase soft switching NPC1-type inverter in FIG. 1.
Figure 6B:
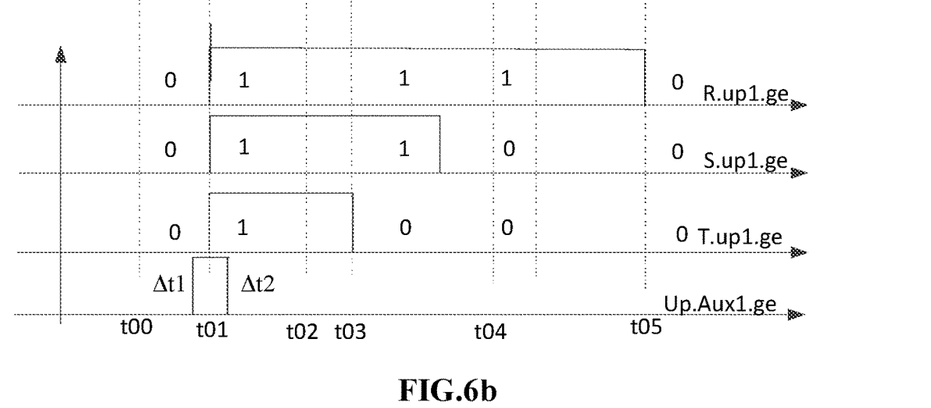
FIG. 6b is a schematic view of a switching combination, modulated with the right-angled sawtooth waves, in a control method for a circuit with a bridge arm according to the present application.

Referring to FIG. 1 and FIGS. 6a and 6b, and referring to FIG. 2, FIG. 3 and FIG. 4, taking R-phase, S-phase and T-phase output voltages in the positive half cycle as an example, and supposing that a power factor PF=1, a positive bridge arm for each phase operates in a Buck operation mode. Supposing that in the initial state the freewheeling diode R.d1 is on to release magnetism, the auxiliary switch Up.Aux1, the main switch R.up1, the main switch S.up1 and the main switch T.up1 are turned off, then for a R-phase bridge arm, current flows out of the freewheeling diode R.d1, the main switch R.down1 and the inductor L.R to a load R1, and current flow directions of a S-phase bridge arm and a T-phase bridge arm are similar to that of the R-phase bridge arm.

A control method for a three-phase NPC-type inverter according to one embodiment comprises the steps of:

S1: detecting whether or not an effective edge of a control signal for the auxiliary switch Up.Aux1 appears, wherein if YES, step S2 is performed, and otherwise the method continues to detect whether or not an effective edge appears. For example, when control signals of the main switch of the bridge arm and the auxiliary switch Up.Aux1 are formed by modulating right-angled sawtooth carrier signals, it is detected whether or not a rising edge appears, wherein if YES, start to perform the step S2, and otherwise perform the step S1, that is, continuing to detect whether or not a rising edge appears.

S2. controlling the auxiliary switch Up.Aux1 to be turned on. At this time, since the coupling inductor Tx.up.Aux limits a rising rate di/dt of current in the auxiliary switch circuit, the turn-on process of the auxiliary switch Up.Aux1 can be softened, and meanwhile the coupling inductor Tx.up.Aux also reduces a declining rate di/dt of current of the freewheeling diode R.d1, suppressing a reverse recovery current of the freewheeling diode R.d1 effectively, thus realizing soft recovery of the freewheeling diode R.d1 (similarly, S.d1 of the S-phase bridge arm and T.d1 of the T-phase bridge arm also realize soft recovery).

S3. As shown in FIG. 6$b$, after the auxiliary switch Up.Aux1 has been turned on for a first time length $\Delta t1$, i.e. at a time t01, current is completely transferred to the auxiliary switch Up.Aux1, accompanied by LC resonance, so as to realize charging of the capacitances connected in parallel with the main switch R.up1 with the upper portion being positive and the lower portion being negative (as shown in FIG. 1), wherein when capacitance voltage is greater than turn-on voltage of the body diode of the main switch R.up1, positive turn-on of the body diode of the main switch R.up1 is realized, such that the LC resonance terminates (the corresponding operating processes of the S-phase bridge arm and the T-phase bridge arm are the same to that of the R-phase bridge arm); at this time, i.e. at the time t01, the main switch R.up1 at the R-phase bridge arm, the main switch S.up1 at the S-phase bridge arm and the main switch T.up1 at the T-phase bridge arm are controlled to be simultaneously turned on, and all the three main switches are main switches of upper bridge arms of the bridge arms for individual phases which are directly connected to buses, that is, positions of the three mains switches in individual bridge arms for corresponding phase are the same.

S4. Starting from the time when the main switch R.up1, the main switch S.up1 and the main switch T.up1 are simultaneously turned on, current is transferred from the auxiliary switch circuit to the main switch circuit, and after elapsing a second period of time $\Delta t2$ starting from the turn-on time, upon complete transfer of the current to the main switch circuit, the auxiliary switch Up.Aux1 is turned off. Since the main switch R.up1 performs a function of turning on and in turn clamping (for the same reasons, the main switch S.up1 and the main switch T.up1 also perform the function of turning on and in turn clamping), approximate zero-voltage zero-current turn-off of the auxiliary switch can be realized However, according to a control method for the existing three-phase NPC-type inverter, as shown in FIG. 6$a$, the main switch R.up1, the main switch S.up1 and the main switch T.up1 are turned on at times t01, t02 and t03, respectively; to perform the function of softening the three switches, the auxiliary switch Up.Aux1 shall perform switching actions three times, causing an increase in loss of the auxiliary switch Up.Aux1, with control being complicated.

Therefore, with once time of action of the auxiliary switch Up.Aux1 in the present embodiment, the function of softening the main switch R.up1, the main switch S.up1 and the main switch T.up1 can be performed, reducing loss of the auxiliary switch Up.Aux1, with control being simplified.

Wherein, the magnitude of $\Delta t1$ and $\Delta t2$ depends on resonance energy, operating frequency, and switching speed.

For the same reasons, when the R-phase, S-phase and T-phase output voltages in the negative half cycle, in the aforesaid step S1, it is necessary to detect whether or not an effective edge of a control signal for the auxiliary switch Down.Aux1 appears, wherein if YES, in the step S3 the main switch R.down1 in the R-phase bridge arm, the main switch S.down1 in the S-phase bridge arm and the main switch T.down1 in the T-phase bridge arm are simultaneously turned on, and all the three main switches are main switches in lower bridge arms of the bridge arms for individual phase which are directly connected to buses, that is, positions of the three main switches in individual bridge arms for corresponding phase are the same.

Similarly, the main switch R.down1 at the R-phase bridge arm, the main switch S.down1 at the S-phase bridge arm and the main switch T.down1 at the T-phase bridge arm are also controlled according to the aforesaid method.

In the NPC-type inverter, as can be seen from the control principle, the frequency of the switching actions of the main switch R.up1 and the main switch R.down1 shall be higher than the frequency of the switching actions of the main switch R.down2 and the main switch R.up2 (similarly, the S-phase bridge arm and the T-phase bridge arm are similar; for example, the frequency of the switching actions of the main switch S.up1 and the main switch S.down1 shall be higher than the frequency of the switching actions of the main switch S.down2 and the main switch S.up2), the main switch R.up1 and the main switch R.down1 generally use high-frequency switches, and the switching actions of the main switch R.up1 and the main switch R.down1 (further including corresponding main switches at the S-phase bridge arm and the T-phase bridge arm) are main reasons for causing the frequent switching actions of the auxiliary switch Up.Aux1. Therefore, in the method according to the present embodiment, control for the main switches at these positions produces a more prominent effect of reducing the frequency of the actions of the auxiliary switch Up.Aux1.

In the step S4, a period of time for turning on a main switch of the bridge arm for each phase can be controlled according to the magnitude of voltage outputted from each phase. As shown in FIG. 6$b$, in one embodiment, starting from a time t00, switching state combinations (R.up1, S.up1, T.up1) of the main switch circuit are sequentially: 000-111-110-100-000; that is, the periods of time for turning on the main switch R.up1, the main switch S.up1 and the main switch T.up1 are sequentially reduced. Of course, if the three-phase NPC-type inverter is required to output other voltages, the aforesaid switching state combinations may also be in other combination manners.

Since the main switch R.up1, the main switch S.up1 and the main switch T.up1 are simultaneously turned on, to cooperate with this control method, control signals for controlling the main switch R.up1, the main switch S.up1, the main switch T.up1 and the auxiliary switch Up.Aux1 are obtained by modulating signal waves using right-angled sawtooth waves as carrier signals, thus facilitating detection of a rising edge of the carrier signals, and also making it possible to maintain the advantages of the control method for the existing three-phase NPC-type inverter.

Figure 7:
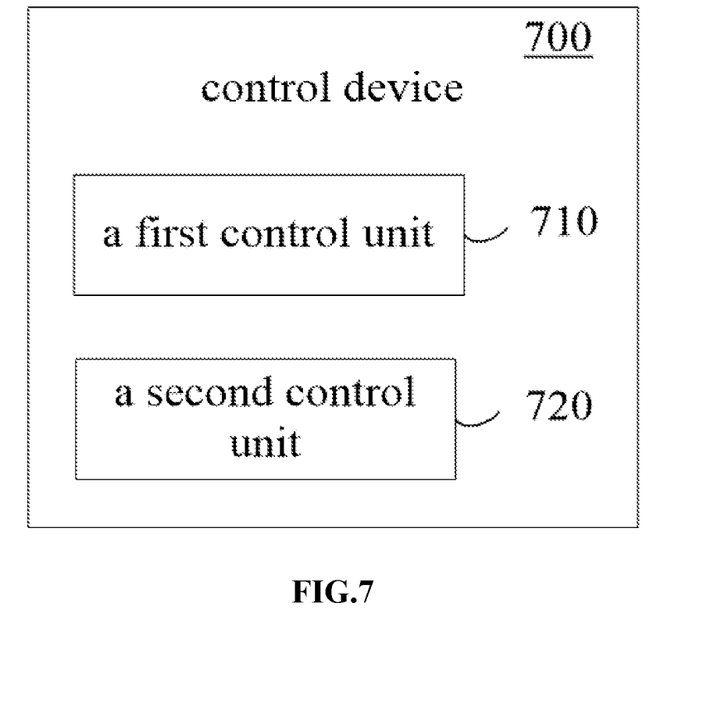
FIG. 7 is a schematic view of a control device for a circuit with bridge arm according to the present application.

FIG. 7 shows a control device 700 for the circuit with bridge arm in which main switches are provided, according to the present application. The control device 700 comprises a first control unit 710 and a second control unit 720. The first control unit 710 is used for, after controlling the auxiliary switch to be turned on for a first period of time, controlling the main switches set at same positions of individual bridge arms to be simultaneously turned on. The second control unit 720 is used for, after a second period of time following a time when the main switches set at the same positions of individual bridge arms are simultaneously turned on, turning off the auxiliary switch.

Further, the first control unit 710 is used for, at a time when current is completely transferred from a main switch circuit comprising the at least two bridge arms in the circuit to an auxiliary switch circuit comprising the auxiliary switch in the circuit, controlling the main switches set at the same positions of individual bridge arms to be simultaneously turned on. The second control unit 720 is used for, at a time when current is completely transferred from the auxiliary switch circuit to the main switch circuit, turning off the auxiliary switch.

The aforesaid contents further describe the present application in detail in combination with the specific preferred embodiments, but it shall not be regarded that the specific embodiments of the present application are limited only to these descriptions. For those ordinarily skilled in the art, without departing from the concept of the present application, simple deductions or substitutions could also be carried out, all of which shall be regarded as belonging to the scope of patent protection of the present application which is determined from the Claims as filed.

What is claimed is:

1. A control method for a circuit with bridge arm in which main switches are provided, wherein the circuit includes: at least two bridge arms, an auxiliary switch assisting in switching of the main switches in the bridge arm, wherein the bridge arm is an NPC (Neutral Point Clamped) bridge arm and includes: (i) a first main switch, a second main switch, a third main switch, and a fourth main switch connected in series between positive and negative terminals of a bus capacitance, (ii) a first diode connected between (a) a first connection point of the first main switch and the second main switch and (b) a neutral point of the bus capacitance, and (iii) a second diode connected between (a) a second connection point of the third main switch and the fourth main switch and (b) the neutral point of the bus capacitance; and two inductors, wherein the two inductors are both connected at one side to the neutral point of the bus capacitance, and, at another side, a first inductor of the two inductors is connected to the first connection point between the first main switch and the second main switch of the bridge arm and a second inductor of the two inductors is connected to the second connection point between the third main switch and the fourth main switch of the bridge arm, and wherein the control method includes steps of (S1.) after controlling the auxiliary switch to be turned on for a first period of time, controlling at least two main switches set at same positions of individual bridge arms to be simultaneously turned on; and (S2.) after a second period of time following a time when the at least two main switches set at the same positions of individual bridge arms are simultaneously turned on, turning off the auxiliary switch.

2. The control method according to claim 1, wherein: control signals of the main switches of the bridge arm and the auxiliary switch are formed by modulating a carrier signal; and prior to the step S1, the control method further comprises a step of:

detecting whether or not an effective edge of the carrier signal appears, and if YES, starting to perform the step S1.

3. The control method according to claim 2, wherein: the carrier signal is right-angled sawtooth wave, the effective edge is a rising edge of the right-angled sawtooth wave.

4. The control method according to claim 1, wherein: the circuit is a soft switching converter.

5. The control method according to claim 1, wherein: the circuit is an AC/DC circuit or a DC/AC circuit.

6. A control device for a circuit with bridge arm in which main switches are provided, wherein the circuit includes: at least two bridge arms, an auxiliary switch assisting in switching of the main switches of the bridge arm, wherein the bridge arm is an NPC (Neutral Point Clamped) bridge arm and includes: (i) a first main switch, a second main switch, a third main switch, and a fourth main switch connected in series between positive and negative terminals of a bus capacitance, (ii) a first diode connected between (a) a first connection point of the first main switch and the second main switch and (b) a neutral point of the bus capacitance, and (iii) a second diode connected between (a) a second connection point of the third main switch and the fourth main switch and (b) the neutral point of the bus capacitance; and two inductors, wherein the two inductors are both connected at one side to the neutral point of the bus capacitance, and, at another side, a first inductor of the two inductors is connected to the first connection point between the first main switch and the second main switch of the bridge arm and a second inductor of the two inductors is connected to the second connection point between the third main switch and the fourth main switch of the bridge arm, and wherein the control device includes: a first control unit for, after controlling the auxiliary switch to be turned on for a first period of time, controlling at least two main switches set at same positions of individual bridge arms to be simultaneously turned on; and a second control unit for, after a second period of time following a time when the at least two main switches set at the same positions of individual bridge arms are simultaneously turned on, turning off the auxiliary switch.

7. The control method according to claim 1, wherein: in the step S1, at a time when current is completely transferred from a main switch circuit comprising the at least two bridge arms in the circuit to an auxiliary switch circuit comprising the auxiliary switch in the circuit, the at least two main switches set at the same positions of individual bridge arms are controlled to be simultaneously turned on; and in the step S2, at a time when current is completely transferred from the auxiliary switch circuit to the main switch circuit, the auxiliary switch is turned off.

8. The control method according to claim 1 wherein: in the step S1, the main switches at the same positions of individual bridge arms which are connected with the bus capacitance are controlled to be simultaneously turned on.

9. The control device according to claim 6, wherein: the first control unit is used for, at a time when current is completely transferred from a main switch circuit comprising the at least two bridge arms in the circuit to an auxiliary switch circuit comprising the auxiliary switch in the circuit, controlling the at least two main switches set at the same positions of individual bridge arms to be simultaneously turned on; and the second control unit is used for, at a time when current is completely transferred from the auxiliary switch circuit to the main switch circuit, turning off the auxiliary switch.

\* \* \* \* \*

UNITED STATES PATENT AND TRADEMARK OFFICE
CERTIFICATE OF CORRECTION

PATENT NO. : 10,601,303 B2  
APPLICATION NO. : 15/666193  
DATED : March 24, 2020  
INVENTOR(S) : Fubin Xu et al.

Page 1 of 1

It is certified that error appears in the above-identified patent and that said Letters Patent is hereby corrected as shown below:

On the Title Page

(54) Title and in the Specification, Column 1, Lines 1-3:
Delete "Control Method and Device for Circuit with a Bridge Arm of a Switch" and insert -- Control Method and Device for Circuit with a Bridge --.

(57) Abstract:
Please delete the Abstract and insert -- The present application discloses a control method and device for a circuit with a bridge arm of a switch. The soft switching converter comprises at least two bridge arms of the switch, and an auxiliary switch assisting in switching of a main switch of the bridge arm of the switch. The control method comprises the steps of: S1. after controlling the auxiliary switch to be turned on for a first period of time, controlling main switches set at same positions of individual bridge arms of the switch to be simultaneously turned on; S2. after a second period of time following a time when the main switches set at the same positions of individual bridge arms of the switch are simultaneously turned on, turning off the auxiliary switch. The present application can reduce system loss and noise, so as to improve efficiency. --.

Signed and Sealed this  
Twenty-seventh Day of May, 2025

Coke Morgan Stewart  
*Acting Director of the United States Patent and Trademark Office*